(12) United States Patent
Vermette et al.

(10) Patent No.: US 7,979,385 B2
(45) Date of Patent: Jul. 12, 2011

(54) SELECTIVE EXPOSURE TO A DATA CONSUMER

(75) Inventors: Shane Robert Vermette, San Carlos, CA (US); Vijay Manguluru, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 491 days.

(21) Appl. No.: 12/147,709

(22) Filed: Jun. 27, 2008

(65) Prior Publication Data

US 2009/0327290 A1     Dec. 31, 2009

(51) Int. Cl.
*G06F 7/00* (2006.01)
(52) U.S. Cl. ........................ 707/603; 707/704
(58) Field of Classification Search .............. 707/703, 707/704
See application file for complete search history.

(56) References Cited

U.S. PATENT DOCUMENTS

| | | | |
|---|---|---|---|
| 6,161,105 A | 12/2000 | Keighan et al. | |
| 6,513,065 B1 * | 1/2003 | Hafez et al. | 709/224 |
| 6,560,647 B1 | 5/2003 | Hafez et al. | |
| 6,748,384 B1 * | 6/2004 | Rylander et al. | 707/812 |
| 6,856,970 B1 | 2/2005 | Campbell et al. | |
| 6,978,265 B2 | 12/2005 | Schumacher | |
| 7,281,013 B2 | 10/2007 | Chaudhuri et al. | |
| 7,454,698 B2 * | 11/2008 | Kohda et al. | 715/254 |
| 7,509,684 B2 | 3/2009 | McDonald et al. | |
| 2005/0066095 A1 * | 3/2005 | Mullick et al. | 710/200 |
| 2009/0248620 A1 | 10/2009 | Vermette | |
| 2009/0248691 A1 | 10/2009 | Vermette | |
| 2009/0328043 A1 | 12/2009 | Vermette | |

OTHER PUBLICATIONS

U.S. Appl. No. 12/059,811, filed Mar. 31, 2008, Office Action mailed Aug. 10, 2010, 14 pages.
U.S. Appl. No. 12/059,830, filed Mar. 31, 2008, Office Action mailed Aug. 24, 2010, 20 pages.

* cited by examiner

*Primary Examiner* — Cam Y Truong
*Assistant Examiner* — Imtiaz Uddin
(74) *Attorney, Agent, or Firm* — Kilpatrick Townsend & Stockton LLP

(57) ABSTRACT

A method for consuming data includes determining a scope of summarization for a data set in response to receiving a request from a summarization program, obtaining a lock on the data within the scope of summarization and consuming the data from the summarization program within the scope of data summarization. The summarization program includes methods configured to obtain concurrent locks on different portions of the data set. The consumption of the data may be governed by specific rules.

18 Claims, 8 Drawing Sheets

SELECTIVE EXPOSURE TO A DATA CONSUMER

CROSS-REFERENCES TO RELATED APPLICATIONS

This application is related to U.S. patent application Ser. No. 12/147,726, filed Jun. 27, 2008, and entitled "INFRASTRUCTURE OF DATA SUMMARIZATION INCLUDING LIGHT PROGRAMS AND HELPER STEPS," filed concurrently herewith, which is hereby incorporated herein by reference. This application is also related to U.S. patent application Ser. No. 12/059,811, filed Mar. 31, 2008, entitled "INTERACTING METHODS OF DATA EXTRACTION," and U.S. patent application Ser. No. 12/059,830, filed Mar. 31, 2008, entitled "INTERACTING METHODS OF DATA SUMMARIZATION," which are hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to providing summarized data, and in particular to selectively exposing data to a data consumer using appropriate and/or different methods.

A common business need is to summarize data that exists in a system. This can be accomplished using a summarization program. Once a summarization program has completed a summarization run, the program can provide the summarized data to a data consumer (e.g., a tool for manipulating or reporting the data). Typically, a tool that consumes the data produced by a summarization program may consume data from tables such as fact tables (containing cost data, revenue data, etc.), dimension tables (containing task hierarchies, parent/child tasks, etc.), resource hierarchies (containing manager, employee, and coworker information), and so on. A data consumer receives or pulls this information and may perform roll-ups on the information.

Presently, many problems are met when providing data to a data consumer. For example, a data consumer may require information regarding a location of the data to be consumed ahead of time. In addition, a data consumer may not be able to pull data from multiple sources when the multiple sources represent the same functional data set but are differentiated by a technical concept such as the data volume they can contain. Also, a data consumer may have different methods for consuming data, but each method may have its own limitations. For instance, one consumption method may perform well with a small volume of data but may perform poorly with a large volume of data. Alternatively, a second consumption method may perform well with a large volume of data but may perform poorly with a small volume of data. Additional examples of previous solutions are discussed below.

In one previous solution, a data consumer is forced to consume data from a data source in whatever manner the data consumer chooses since the data consumer is not utilizing advanced information from the summarization program and must attempt to make its own optimizations. For example, the data consumer may impose requirements on the data source such as logging, events, flagging, etc. However, when the data consumer is designed to perform well on particular data volumes, rather than on particular data volumes extracted from a large data source, then a more specialized method as described herein can be introduced which can have better performance than existing methods.

In another previous solution, a metadata-based data consumer is based on a single table responsible for both bulk and incremental data. While refreshing an incremental amount of data, the data consumer is forced to determine whether to refresh all the data or to try to somehow determine the incremental context.

Generally, initial implementations of a data consumer begin with a bulk method followed by incremental methods thereafter. Often, if a large volume of data was to be subsequently consumed, the data consumer would have to be reset and an initial bulk summarization would have to be performed.

BRIEF SUMMARY OF THE INVENTION

Systems and methods in accordance with various embodiments of the present invention can overcome these and other deficiencies in existing approaches to extracting and/or summarizing data.

In various embodiments, a method for consuming data includes determining a scope of summarization for a data set in response to receiving a request from a summarization program. A lock on data within the scope of summarization for the data set is obtained and the data from the summarization program within the scope of data summarization is consumed. The summarization program includes methods configured to obtain concurrent locks on different portions of the data set.

In some embodiments, the method may further include exposing data within the scope of summarization through an instance of a view object. The method may further include storing rules for the exposing of data through the view object based, at least in part, upon the corresponding method of the summarization program. The method may further include setting parameters for the summarization program whereby the scope of summarization defines a specific functional set of data. The method may include a consumer of the data within the scope of summarization that is metadata based. The methods may include bulk, incremental, and refresh summarization methods. The bulk summarization method may be configured to guarantee that no data exists in an incremental context table or an incremental table, the incremental method may be configured to guarantee that no data exists in a bulk fact or an incremental context table, and the refresh method may be configured to guarantee that data exists in either the bulk fact or the incremental context table. Data within the scope of summarization may not concurrently exist in both the bulk fact and the incremental context during consumption. The bulk method may be further configured to append summarized data into the bulk fact. At least one of the methods may be configured to guarantee that no data exists in an incremental context table or an incremental table.

A further understanding of the nature and the advantages of the inventions disclosed herein may be realized by reference of the remaining portions of the specification and the attached drawings.

BRIEF DESCRIPTION OF THE DRAWINGS

Various embodiments will be described with reference to the drawings, in which.

DETAILED DESCRIPTION OF THE INVENTION

Systems and methods in accordance with various embodiments overcome the aforementioned and other deficiencies in existing approaches to data management and/or consumption. Various embodiments leverage advanced knowledge about summarized data to suit the requirements of a data consumer. Embodiments allow for efficient use of a metadata-based data consumer, for bulk maintenance of a data consumer, and for efficient incremental maintenance of a data consumer that operates efficiently on small sets of data by exposing a specific portion of all of the data. Embodiments also allow for exposure of an incremental data set without a join operation if a data consumer takes incremental data and for refresh maintenance of a data consumer.

Figure 1:
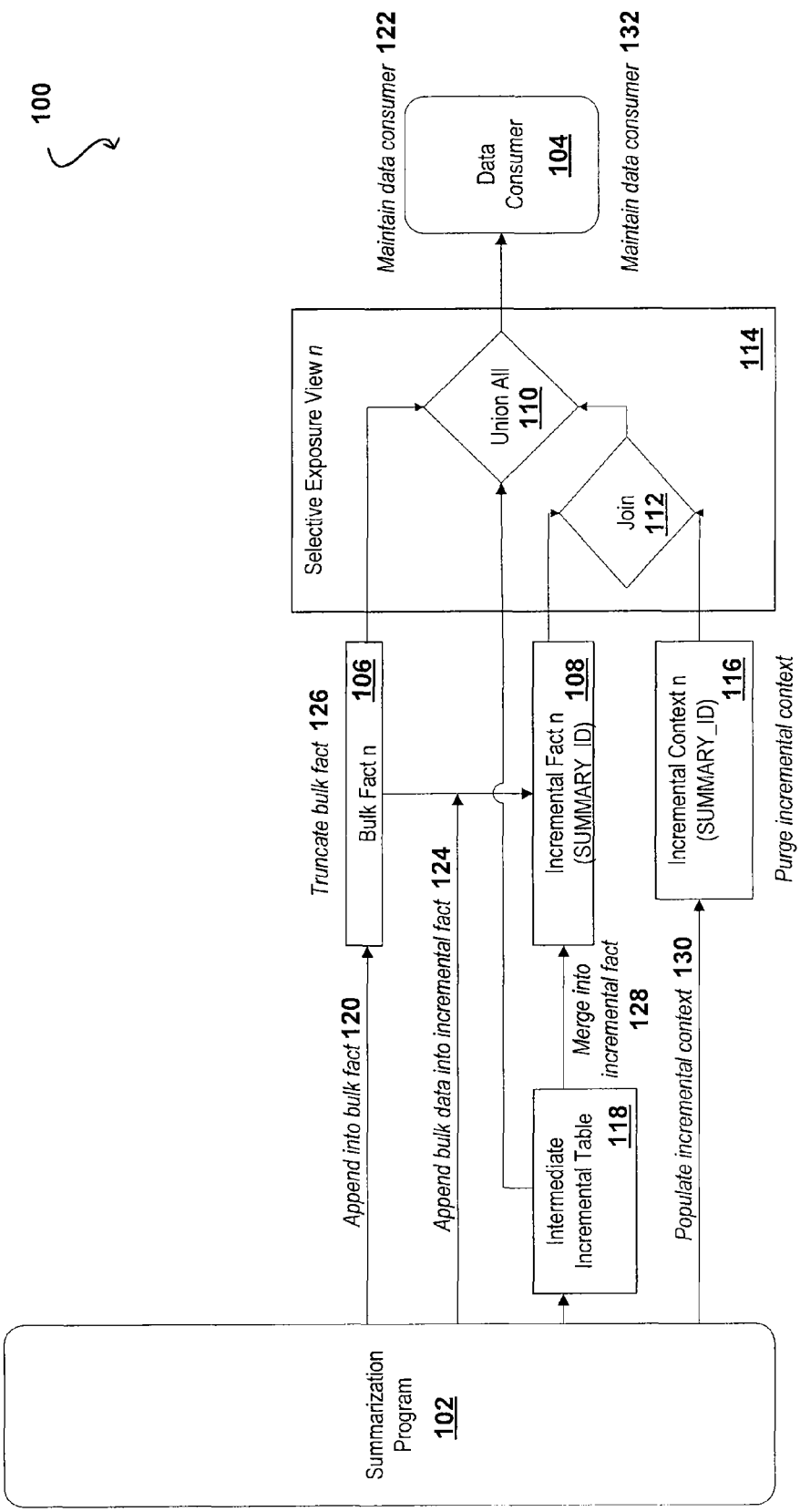
FIG. 1 illustrates an exemplary method for consuming data that can be used in accordance with one embodiment.

FIG. 1 illustrates an exemplary method 100 for consuming data that can be used in accordance with one embodiment. A summarization program 102 can summarize data that exists in a system. Summarization programs are described, for example, in co-pending U.S. patent application Ser. No. 12/059830, which is hereby incorporated herein by reference. The data can be extracted, cleansed, transformed, and/or loaded into fact tables by the summarization program 102. Accordingly, after the summarization program 102 performs a summarization run, the data can reside in a number of fact tables. If the fact tables populated by the summarization program 102 are considered to be a layer, then there may be additional layers on top of the fact tables that manipulate the data before the data is ready to be viewed by an end user. In one implementation, the data in the fact tables may be consumed by a layer that, for example, performs efficient rollups of the data along predefined hierarchies. The layer, which as in FIG. 1 can be called the data consumer 104, may consume the data in such a way that it is efficient to expose the data to the data consumer 104 in a controlled manner. The data consumer can involve any manipulation of the fact table data as determined necessary by business needs. For the purposes of the explanation herein, the predefined objects are database views, although other such objects can be used as appropriate.

The data consumer 104 can have different methods for consuming the data. That is, the data consumer may be able to efficiently consume a large volume of data given certain conditions in what can be called a bulk method. The data consumer 104 may be able to efficiently consume a small volume of data given certain conditions in what may be called an incremental method. This is different from, for example, the summarization program 102, which can be designed to extract differing volumes of data from a large data source. In the incremental case, volume data could be processed that may already exist and has already been exposed to the data consumer. New incremental data may exist which affects some portion of the data that has already been exposed. Depending on the data consumer and the requirements of the summarization program, it may be necessary to merge the data with the data that has already been exposed and then to re-expose the data.

Deciding which method to use for the data consumer can be determined and exploited by the summarization program 102, which has control over the volume of data it is processing. The summarization program 102 can selectively expose a large volume of summarized data to the data consumer 104 or a small volume of summarized data to the data consumer. The summarization program 102 can also refresh the data in the data consumer 104 by re-exposing a portion of the summarized data to the data consumer 104 that had previously been exposed, thereby allowing for refresh maintenance of the data consumer. Allowing the data consumer to determine the method of exposure based on changes in the system would undesirably require maintenance of logging, flagging, or the like. Accordingly, since the summarization program may have advanced knowledge, it is unnecessary to allow the data consumer to determine the method of exposure and such maintenance steps are avoided. For example, this can be done by simply remembering the context of changes that have been made to the data, providing a simple join based on that context, and exposing only that data so that the consumer does not have to look through the data at all. Accordingly, various embodiments described or suggested herein leverage advanced knowledge about summarized data to suit the needs of the data consumer 104.

Certain embodiments allow for bulk maintenance of the data consumer 104 (no join is used on the data when maintaining the data consumer 104 in the bulk method).

Typically, system resources and business needs dictate the method used for the data consumer 104. Limited system resources could cause a restriction on the volume of data that can be summarized, which would result in the use of frequent incremental methods for the data consumer 104. Whereas a business need may be to use minimal resources at certain times when users are on the system and to summarize all data during off hours, which would cause a need for a bulk method for the data consumer 104 and periodic incremental methods for the data consumer 104. Many other business needs exist that would require various uses of the methods of the data consumer. Various embodiments allow for efficient incremental maintenance of a data consumer 104 that operates efficiently on small sets of data by exposing a specific portion of all of the data to the data consumer. Some embodiments allow for exposure of the incremental data set without a join if the data consumer 104 takes incremental data.

The data consumer 104 can be metadata-based, which would require the consumer to be defined on top of predefined objects. Various embodiments are applicable to any source of data that must be exposed to a metadata-based or otherwise-based data consumer, and may be particularly useful when the data consumer 104 is designed to operate on exposure to different volumes of data, rather than extraction of different volumes of data. Certain embodiments provide a scalable project reporting solution that can efficiently expose data to metadata-based or otherwise-based layers. Accordingly, various embodiments allow for efficient use of a metadata-based data consumer 104 (i.e. allows a logical layer to be exposed to the data consumer).

Various methods described herein may be used when the data consumer 104 is a single instance operating a queuing system. Further, multiple incremental methods may be used in parallel when the data consumer 104, operate in parallel and multiple refresh methods on sufficiently small volumes of data, and in parallel when the data consumer 104 can operate in parallel. Additionally, the data consumer 104 may be able to operate efficiently on data that is ordered by an appropriate index.

Because the data consumer 104 can be metadata-based, the consumer can be dependent on predefined database objects. If the data consumer is metadata-based, the location of the data to be consumed is defined ahead of time in at least some embodiments. Further, a metadata-based consumer may not be able to receive data from multiple sources when the multiple sources represent the same functional data set but are differentiated by a technical concept such as the data volume they can contain. A view (which could be any object that accepts/receives data, but for the purposes of explanation in this example, a view) can be defined such that the data consumer will be provided only one location from which to receive data. This view may be pulling data from a bulk source, a fact, an incremental source, and so on, based on rules that are defined for the data underlying the view. The view described below can be such a predefined database object.

Referring again to FIG. 1., consider three fact tables, a bulk fact table 106, an incremental fact table 108, and an intermediate incremental table 118. The bulk fact table 106, incremental fact table 108, and intermediate incremental table 118 have similar structures to enable a union-all operation 110, and/or join operation 112, except that the incremental fact table 108 may have an additional column SUMMARY_ID. Now consider a table that defines a context on the incremental fact table 108. The incremental context table 116 may also contain a column SUMMARY_ID. The view may be constructed as follows:

```
select
    b_f.*
from
    bulk_fact b_f
union all
select
    i_t.*
from
    incremental_table i_t
union all
select /*+ ordered */
    i_f.* // except for SUMMARY_ID
from
    incremental_context i_c,
    incremental_fact i_f
where
    i_f.SUMMARY_ID = i_c.SUMMARY_ID;
```

Figure 2:
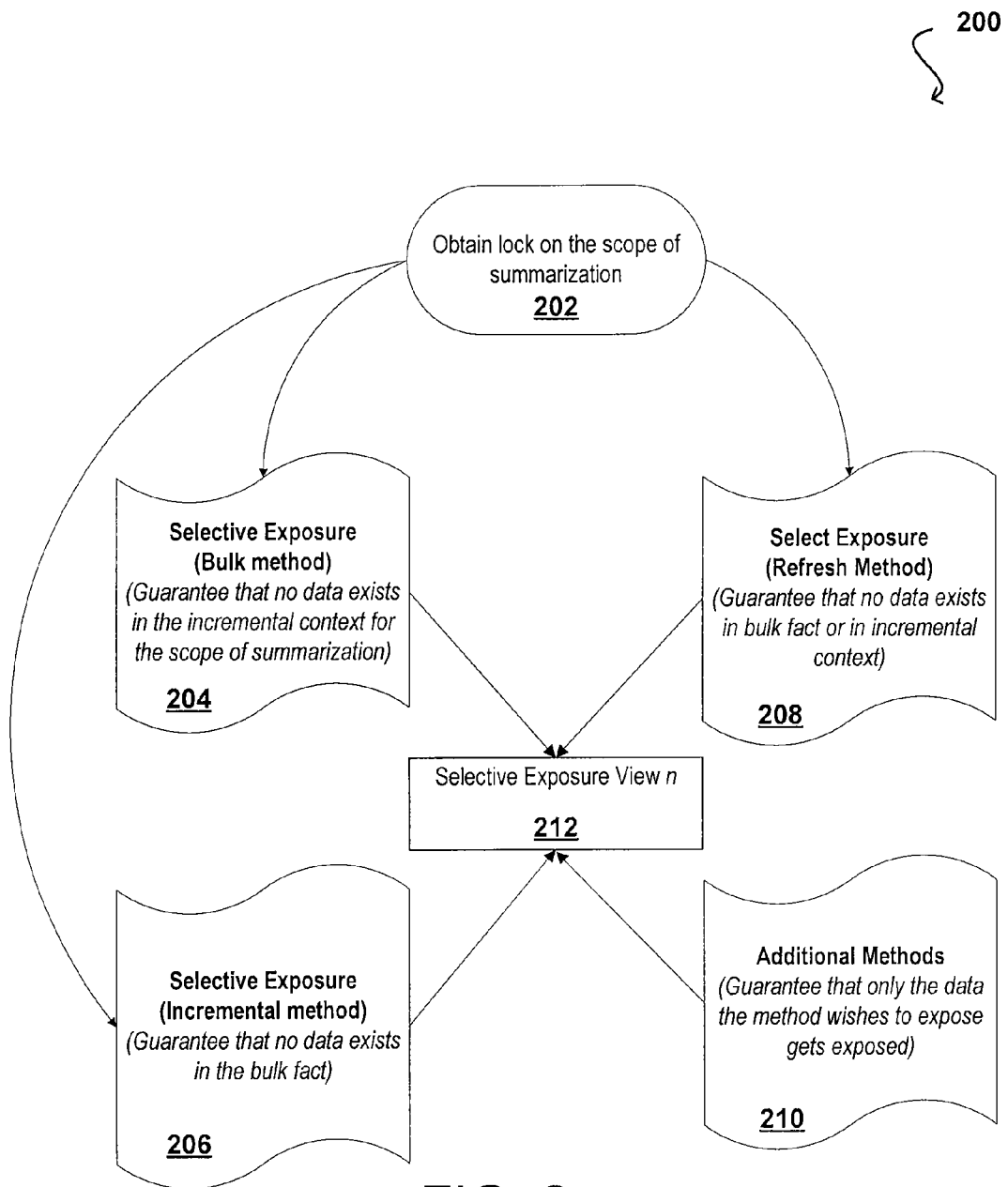
FIG. 2 illustrates an exemplary method for consuming data that can be used in accordance with one embodiment.

FIG. 2 illustrates an exemplary method 200 for consuming data that can be used in accordance with one embodiment. As indicated in FIG. 2, two different methods cannot operate on the same data set in the selective exposure view 114 at the same time. This can be achieved using any appropriate locking mechanism known in the art to obtain a lock on the scope of summarization 202.

Also, as indicated in the example of FIG. 2, for different methods to work together, the methods must guarantee that only the data they wish to expose will be exposed to the data consumer as a selective exposure view 212. More specifically, the bulk method 204 must guarantee that no data exists in the incremental context table; the incremental method 206 must guarantee that no data exists in the bulk fact; and the refresh method 208 must guarantee that data exists in either the bulk fact or the incremental context table. Additional methods 210 would similarly need to guarantee that only the data they wish to expose will be exposed. While the data consumer is being maintained, data within the same scope of summarization cannot exist in both the bulk fact and the incremental context. In some embodiments, these properties may be guaranteed by the rules shown in FIGS. 3-6 and described below.

Various embodiments allow for initial summarizations and data consumption with an incremental method. As opposed to the traditional method, where an initial population would be performed by a bulk method and followed by incremental methods, certain embodiments allow for at least one incremental method to be performed first. Following the one or more incremental methods, a bulk method may be performed where a portion, if not all, of the data history is consumed. In so doing, a reset of the data consumer can be avoided.

Figure 3:
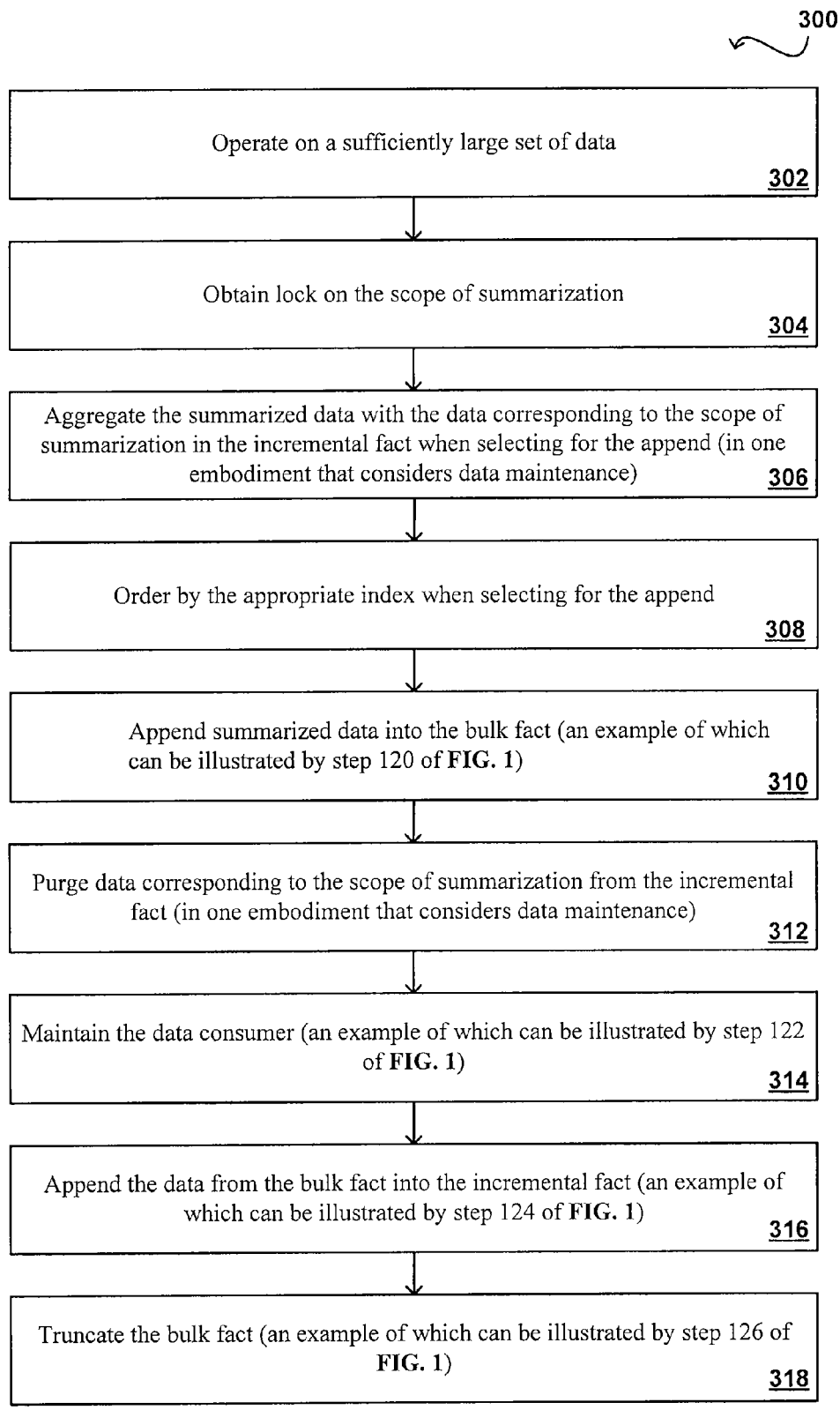
FIG. 3 illustrates an exemplary method for consuming data that can be used in accordance with one embodiment.

FIG. 3 illustrates an exemplary method 300 for consuming data that can be used in accordance with one embodiment. As described by steps in FIGS. 3-6, some steps in FIGS. 3-6 can be used in conjunction with steps shown in FIG. 1. In a bulk method, a sufficiently large set of data is operated on 302. A lock on the scope of summarization is obtained 304. In some embodiments, data maintenance can be considered and the summarized data is aggregated with the data corresponding to the scope of summarization in the incremental fact when selecting for the append 306. When selecting for the append, the data is ordered by the appropriate index 308. Summarized data may be appended into the bulk fact 310, an example of which can be illustrated by step 120 of FIG. 1. In some embodiments that consider data maintenance, data corresponding to the scope of summarization from the incremental fact is purged 312. The data consumer is maintained 314, data from the bulk fact is appended into the incremental fact 316, and the bulk fact is truncated 318, examples of which can be illustrated by steps 122, 124, and 126, respectively, of FIG. 1.

Figure 4:
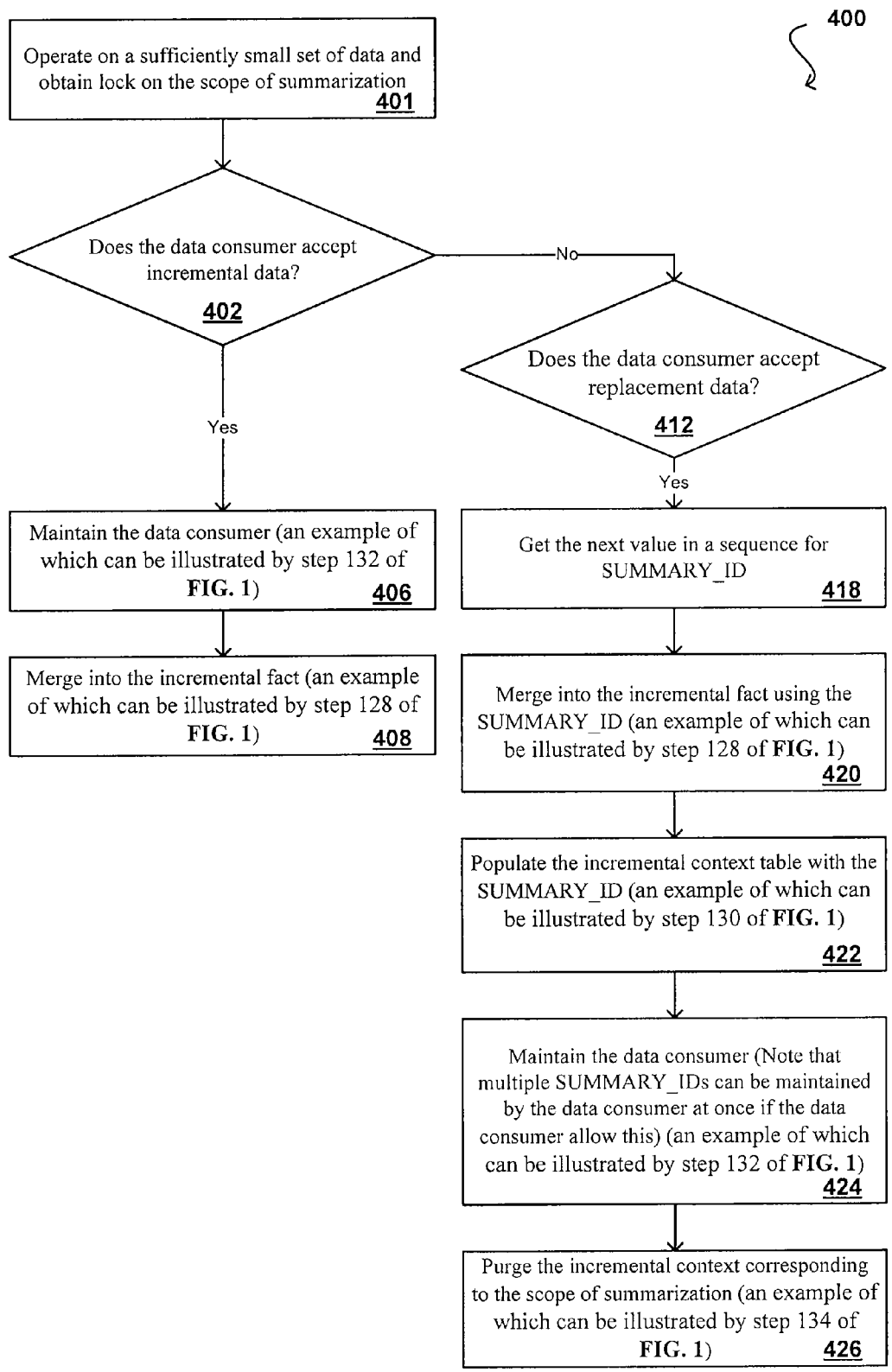
FIG. 4 illustrates an exemplary method for consuming data that can be used in accordance with one embodiment.

FIG. 4 illustrates an exemplary method 400 for consuming data that can be used in accordance with one embodiment. In an incremental method, a sufficiently small set of data is operated on and a lock on the scope of summarization is obtained 401. If the data consumer accepts incremental data 402, then, the data consumer is maintained 406 (an example of which can be illustrated by step 132 of FIG. 1), and the incremental fact is merged into 408 (an example of which can be illustrated by step 128 of FIG. 1). Otherwise, if the data consumer accepts replacement data 412, then the following steps are performed. The next value in a sequence for SUMMARY_ID is acquired 418. The incremental fact is merged into using the SUMMARY_ID 420, the incremental context table is populated with the SUMMARY_ID 422, and the data consumer is maintained 424, examples of which can be illustrated by steps 128, 130, and 132, respectively, of FIG. 1. Multiple SUMMARY_IDs can be maintained by the data consumer at once if the data consumer allows this. The incremental context corresponding to the scope of summarization is purged 426, an example of which can be illustrated by step 134 of FIG. 1.

Figure 5:
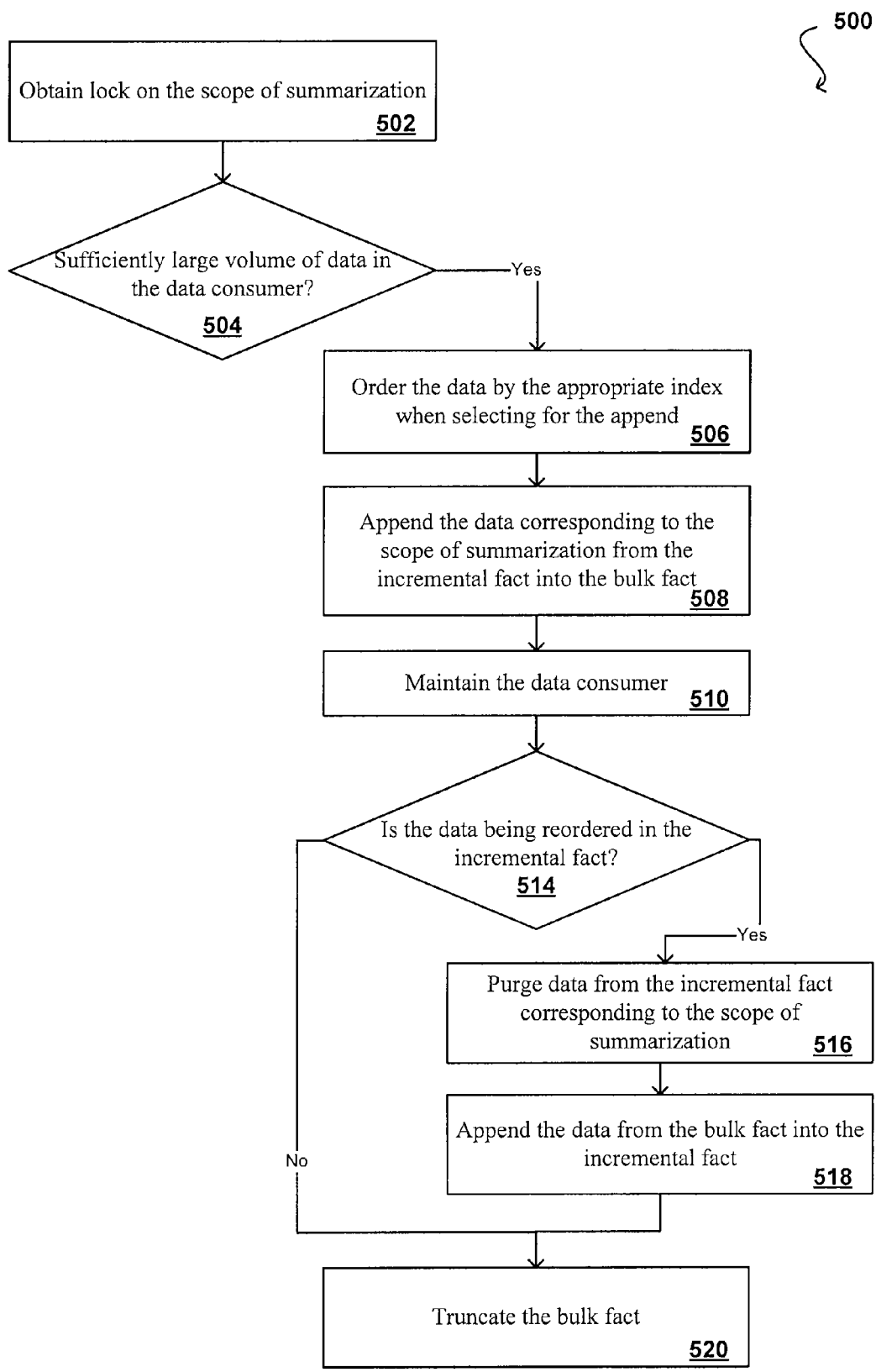
FIG. 5 illustrates an exemplary method for consuming data that can be used in accordance with one embodiment.
Figure 6:
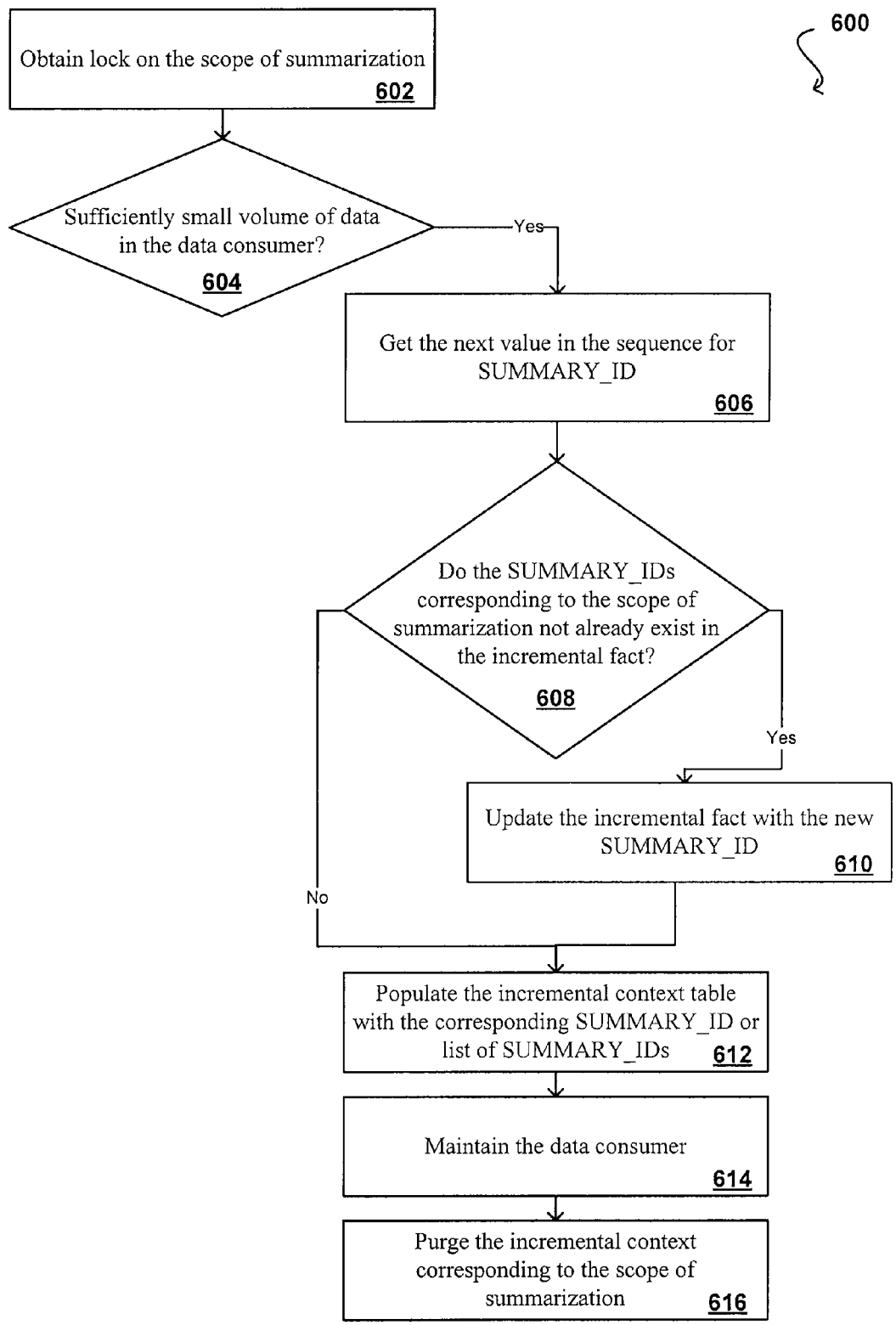
FIG. 6 illustrates an exemplary method for consuming data that can be used in accordance with one embodiment.

FIGS. 5-6 illustrate an exemplary method for consuming data that can be used in accordance with one embodiment. In an embodiment that considers data maintenance, a refresh method obtains a lock on the scope of summarization 502 and 602. Referring to FIG. 5, if a sufficiently large volume of data in the data consumer is being refreshed 504, then the data is ordered by the appropriate index when selecting for the append 506, the data corresponding to the scope of summarization from the incremental fact is appended into the bulk fact 508, and the data consumer is maintained 510. If the data is being reordered in the incremental fact 514 (e.g. when data maintenance is being considered), then the data from the incremental fact corresponding to the scope of summarization is purged 516 and the data from the bulk fact is appended into the incremental fact 518. Finally, the bulk fact is truncated 520. It will be appreciated that the method for consuming data 500 described herein is illustrative and that variations and modifications are possible. For example, in some embodiments, the data in the incremental fact may be reordered or defragmented. Such an optional step may increase process time to completion but will improve performance of queries on the data.

Referring to the steps 600 of FIG. 6, if a sufficiently small volume of data in the data consumer is being refreshed 604, the next value in the sequence for SUMMARY_ID is acquired 606. If the SUMMARY_IDs corresponding to the scope of summarization already exist in the incremental fact 608, the incremental fact is updated with the new SUMMARY_ID 610. Otherwise, the incremental context table is populated with the corresponding SUMMARY_ID or list of SUMMARY_IDs 612, the data consumer is maintained 614, and the incremental context corresponding to the scope of summarization is purged 616.

Figure 7:
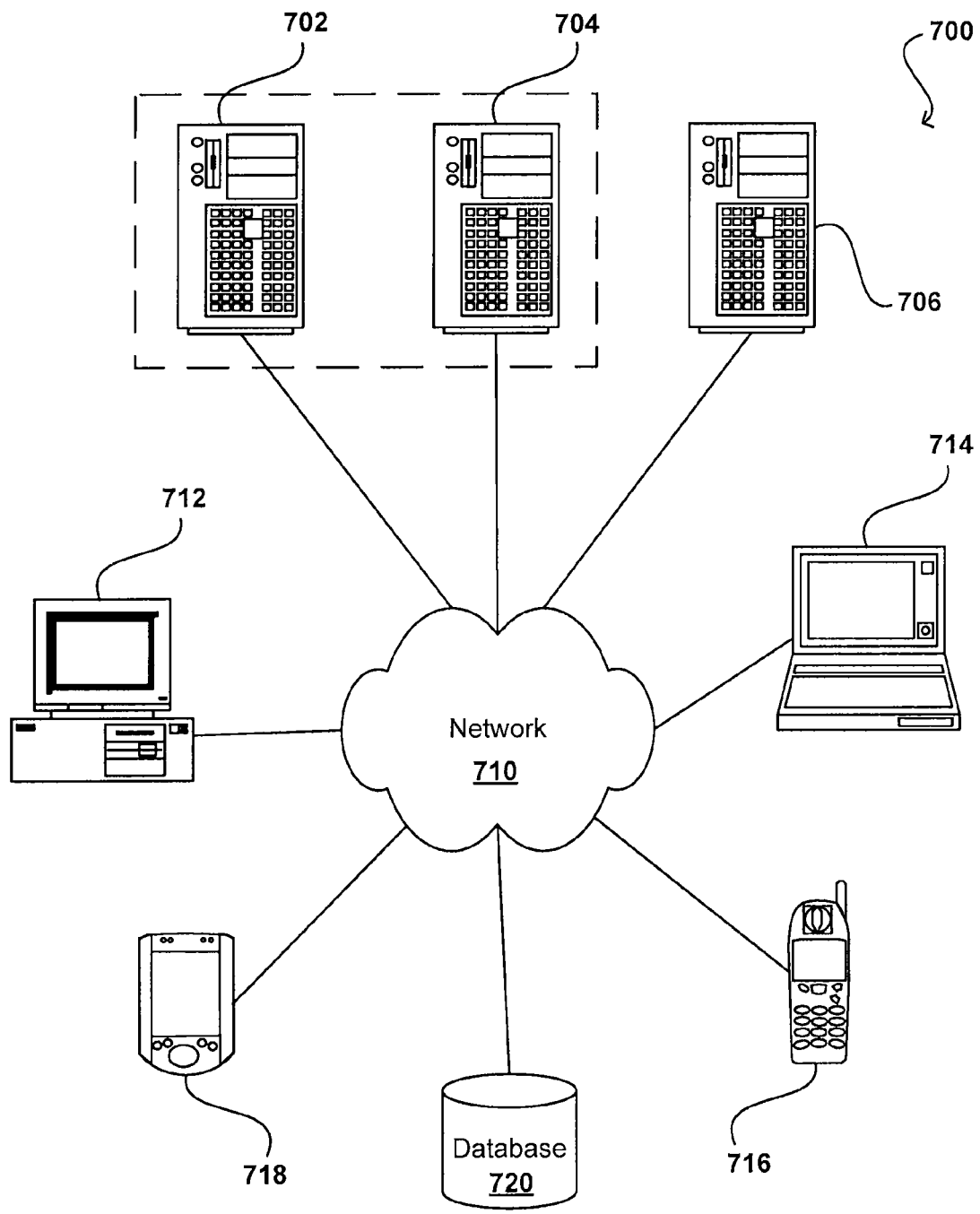
FIG. 7 illustrates components of a computer network that can be used in accordance with one embodiment.

Operating Environment:

FIG. 7 is a block diagram illustrating components of an exemplary operating environment in which various embodiments may be implemented. The system 700 can include one or more user computers, computing devices, or processing devices 712, 714, 716, 718, which can be used to operate a client, such as a dedicated application, web browser, etc. The user computers 712, 714, 716, 718 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 712, 714, 716, 718 may also have any of a variety of applications, including one or more development systems, database client and/or server applications, and Web browser applications. Alternatively, the user computers 712, 714, 716, 718 may be any other electronic device, such as a thin-client computer, Internet-enabled gaming system, and/or personal messaging device, capable of communicating via a network (e.g., the network 710 described below) and/or displaying and navigating Web pages or other types of electronic documents. Although the exemplary system 700 is shown with four user computers, any number of user computers may be supported.

In most embodiments, the system 700 includes some type of network 710. The network may can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 706) may be dedicated to running applications, such as a business application, a Web server, application server, etc. Such servers may be used to process requests from user computers 712, 714, 716, 718. The applications can also include any number of applications for controlling access to resources of the servers 702, 704, 706.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 712, 714, 716, 718. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsofti®, Sybase®, IBM® and the like, which can process requests from database clients running on a user computer 712, 714, 716, 718.

The system 700 may also include one or more databases 720. The database(s) 720 may reside in a variety of locations. By way of example, a database 720 may reside on a storage medium local to (and/or resident in) one or more of the computers 702, 704, 706, 712, 714, 716, 718. Alternatively, it may be remote from any or all of the computers 702, 704, 706, 712, 714, 716, 718, and/or in communication (e.g., via the network 710) with one or more of these. In a particular set of embodiments, the database 720 may reside in a storage-area network ("SAN") familiar to those skilled in the art. Similarly, any necessary files for performing the functions attributed to the computers 702, 704, 706, 712, 714, 716, 718 may be stored locally on the respective computer and/or remotely, as appropriate. In one set of embodiments, the database 720 may be a relational database, such as Oracle 10 g, that is adapted to store, update, and retrieve data in response to SQL-formatted commands.

Figure 8:
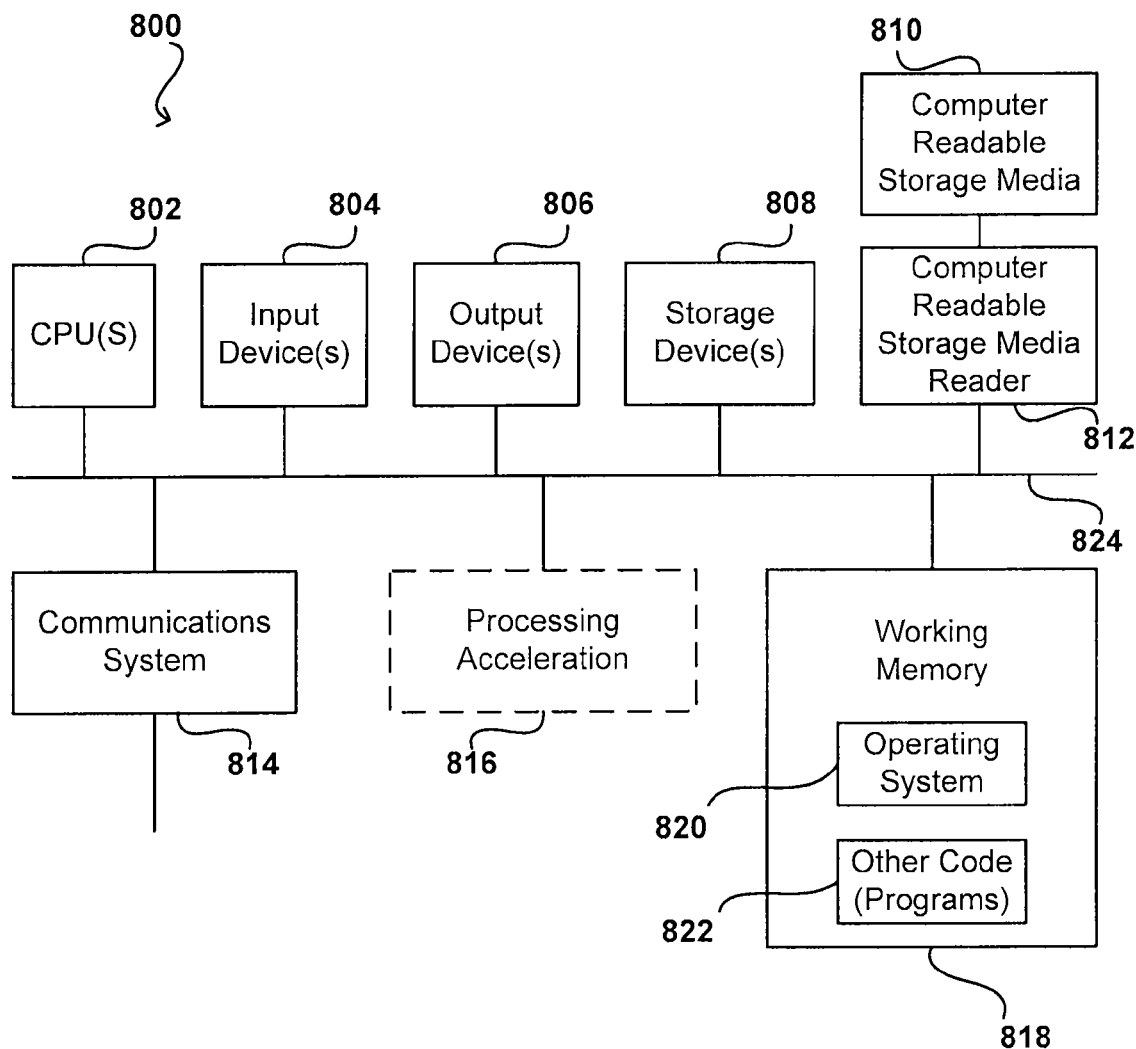
FIG. 8 illustrates components of a computerized device that can be used in accordance with one embodiment.

FIG. 8 illustrates an exemplary computer system 800, in which various embodiments may be implemented. The system 800 may be used to implement any of the computer systems described above. The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 812, a communications system 814 (e.g., a modem, a network card (wireless or wired), an infra-red communication device, etc.), and working memory 818, which may include RAM and ROM devices as described above. In some embodiments, the computer system 800 may also include a processing acceleration unit 816, which can include a digital signal processor DSP, a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information. The communications system 814 may permit data to be exchanged with the network and/or any other computer described above with respect to the system 800.

The computer system 800 may also comprise software elements, shown as being currently located within a working memory 818, including an operating system 820 and/or other code 822, such as an application program (which may be a client application, Web browser, mid-tier application, RDBMS, etc.). It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include only statutory media known or used in the art, including storage media, such as volatile and non-volatile, removable and non-removable media implemented in any method or technology for storage such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices which can be used to store the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for consuming data, comprising:
   determining, by a computer system, a scope of summarization for a data set in response to receiving a request from a summarization program;
   obtaining, by the computer system, a lock on data within the scope of summarization for the data set; and
   consuming, by the computer system, the data from the summarization program within the scope of data summarization,
   wherein the summarization program includes methods configured to obtain concurrent locks on different portions of the data set, wherein the methods include bulk, incremental, and refresh summarization methods, and
   wherein the bulk summarization method is configured to guarantee that no data exists in an incremental context table or an incremental table, the incremental method is configured to guarantee that no data exists in a bulk fact or an incremental context table, and the refresh method is configured to guarantee that data exists in either the bulk fact or the incremental context table.

2. The method according to claim 1, further comprising:
   exposing data within the scope of summarization through an instance of a view object.

3. The method according to claim 2, further comprising:
   storing rules for the exposing of data through the view object based, at least in part, upon the corresponding method of the summarization program.

4. The method according to claim 1, further comprising:
   setting parameters for the summarization program whereby the scope of summarization defines a specific functional set of data.

5. The method according to claim 1, wherein:
   a consumer of the data within the scope of summarization is metadata based.

6. The method according to claim 1, wherein:
   data within the scope of summarization cannot concurrently exist in both the bulk fact and the incremental context during consumption.

7. The method according to claim 1, wherein:
   the bulk method is further configured to append summarized data into the bulk fact.

8. The method according to claim 1, wherein:
   at least one of the methods is configured to guarantee that no data exists in an incremental context table or an incremental table.

9. A system for consuming data, comprising:
   a processor; and
   a memory device including instructions that, when executed by the processor, cause the processor to:
   determine a scope of summarization for a data set in response to receiving a request from a summarization program;
   obtain a lock on data within the scope of summarization for the data set; and
   consume the data from the summarization program within the scope of data summarization,
   wherein the summarization program includes methods configured to obtain concurrent locks on different portions of the data set, wherein the methods include bulk, incremental, and refresh summarization methods, and
   wherein the bulk summarization method is configured to guarantee that no data exists in an incremental context table or an incremental table, the incremental method is configured to guarantee that no data exists in a bulk fact or an incremental context table, and the refresh method is configured to guarantee that data exists in either the bulk fact or the incremental context table.

10. The system according to claim 9, wherein the memory device further includes instructions that, when executed by the processor, cause the processor to:
    expose data within the scope of summarization through an instance of a view object.

11. The system according to claim 10, wherein the memory device further includes instructions that, when executed by the processor, cause the processor to:
    store rules for the exposing of data through the view object based, at least in part, upon the corresponding method of the summarization program.

12. The system according to claim 9, wherein the memory device further includes instructions that, when executed by the processor, cause the processor to:

set parameters for the summarization program whereby the scope of summarization defines a specific functional set of data.

13. The system according to claim 9, wherein:
data within the scope of summarization cannot concurrently exist in both the bulk fact and the incremental context during consumption.

14. A non-transitory computer readable storage medium for consuming data having sets of instructions stored thereon which, when executed by a computer, cause the computer to:
determine a scope of summarization for a data set in response to receiving a request from a summarization program;
obtain a lock on data within the scope of summarization for the data set; and
consume the data from the summarization program within the scope of data summarization,
wherein the summarization program includes methods configured to obtain concurrent locks on different portions of the data set, wherein the methods include bulk, incremental, and refresh summarization methods, and
wherein the bulk summarization method is configured to guarantee that no data exists in an incremental context table or an incremental table, the incremental method is configured to guarantee that no data exists in a bulk fact or an incremental context table, and the refresh method is configured to guarantee that data exists in either the bulk fact or the incremental context table.

15. The non-transitory computer readable storage medium according to claim 14, having instruction for exposing data within the scope of summarization through an instance of a view object.

16. The non-transitory computer readable storage medium according to claim 15, having instruction for storing rules for the exposing of data through the view object based, at least in part, upon the corresponding method of the summarization program.

17. The non-transitory computer readable storage medium according to claim 14, having instruction for setting parameters for the summarization program whereby the scope of summarization defines a specific functional set of data.

18. The non-transitory computer readable storage medium according to claim 14, wherein:
data within the scope of summarization cannot concurrently exist in both the bulk fact and the incremental context during consumption.

* * * * *

UNITED STATES PATENT AND TRADEMARK OFFICE
CERTIFICATE OF CORRECTION

| | | |
|---|---|---|
| PATENT NO. | : 7,979,385 B2 | Page 1 of 1 |
| APPLICATION NO. | : 12/147709 | |
| DATED | : July 12, 2011 | |
| INVENTOR(S) | : Vermette et al. | |

It is certified that error appears in the above-identified patent and that said Letters Patent is hereby corrected as shown below:

In column 8, line 30, delete "Microsofti®," and insert -- Microsoft®, --, therefor.

Signed and Sealed this
Fifteenth Day of November, 2011

David J. Kappos
*Director of the United States Patent and Trademark Office*